(12) United States Patent  
Hoghoj et al.

(10) Patent No.: US 8,121,258 B2
(45) Date of Patent: Feb. 21, 2012

(54) DEVICE FOR PROVIDING A HIGH ENERGY X-RAY BEAM

(75) Inventors: Peter Hoghoj, Saint Martin le Vinoux (FR); Pascal Boulee, Claix (FR); Paraskevi Ntova, Fontaine (FR); Sergio Rodrigues, Voreppe (FR)

(73) Assignee: Xenocs, Sassenage (FR)

( * ) Notice: Subject to any disclaimer, the term of this patent is extended or adjusted under 35 U.S.C. 154(b) by 232 days.

(21) Appl. No.: 12/667,464

(22) PCT Filed: Jul. 2, 2008

(86) PCT No.: PCT/FR2008/000946
§ 371 (c)(1),
(2), (4) Date: Dec. 31, 2009

(87) PCT Pub. No.: WO2009/024669
PCT Pub. Date: Feb. 26, 2009

(65) Prior Publication Data
US 2011/0255668 A1 Oct. 20, 2011

(30) Foreign Application Priority Data

Jul. 2, 2007 (FR) .................................. 07 56227

(51) Int. Cl.
*H01J 35/10* (2006.01)
(52) U.S. Cl. ........................ 378/125; 378/138

(58) Field of Classification Search .................. 378/119, 378/121, 125, 130, 138, 143, 144
See application file for complete search history.

(56) References Cited

U.S. PATENT DOCUMENTS

| 4,167,671 | A | | 9/1979 | Boden et al. | |
|---|---|---|---|---|---|
| 4,523,327 | A | * | 6/1985 | Eversole | ........................ 378/124 |
| 4,972,449 | A | | 11/1990 | Upadhya et al. | |
| 5,020,086 | A | * | 5/1991 | Peugeot | ........................ 378/113 |
| 6,456,688 | B1 | | 9/2002 | Taguchi et al. | |
| 6,823,042 | B2 | | 11/2004 | Hayashi et al. | |
| 2005/0117239 | A1 | | 6/2005 | Hoghoj et al. | |
| 2005/0190885 | A1 | | 9/2005 | Ebersberger et al. | |
| 2006/0013364 | A1 | | 1/2006 | Sakata et al. | |

FOREIGN PATENT DOCUMENTS

| DE | 27 16 079 B1 | 8/1978 |
|---|---|---|
| DE | 10 2004 005 937 A1 | 9/2005 |
| EP | 1 273 906 A2 | 1/2003 |
| EP | 1 462 794 A2 | 9/2004 |
| WO | WO-03/048745 A2 | 6/2003 |
| WO | WO-2004/001769 A1 | 12/2003 |

* cited by examiner

*Primary Examiner* — Hoon Song
(74) *Attorney, Agent, or Firm* — Birch, Stewart, Kolasch & Birch, LLP (57) ABSTRACT

The invention relates to X-ray analytical instruments (RX), more precisely a device for providing a high energy X-ray beam, typically above 4 keV, for X-ray analysis applications. The device comprises an X-ray tube with a turning anode and an X-ray lens for shaping the beam.

20 Claims, 4 Drawing Sheets

DEVICE FOR PROVIDING A HIGH ENERGY X-RAY BEAM

AREA OF THE INVENTION

The present invention concerns the area of analytical X-ray (RX) instrumentation. More precisely, it concerns a device to deliver an X-ray beam at high energy, typically more than 4 keV, for analytical applications using X-rays.

STATE OF THE ART

The invention applies to X-ray analytical instrumentation of different types (X-ray diffraction, X-ray fluorescence, small-angle diffusion, reflectometry) notably used for research into materials or in X-ray metrology for the fabrication of semiconductors.

As an example of X-ray instrumentation applied to materials research, mention may be made of applications such as protein crystallography or the analysis of nanomaterials by small angle diffusion.

As metrology applications for the fabrication of semiconductors, mention may also be made of applications such as measurement of thickness or roughness of thin layers, or of thin layer stacking by X-ray reflectometry, texture analysis of crystalline or polycrystalline thin layers by X-ray diffraction, or the analysis of lithography patterns (critical dimensions, etch profiles) by small angle diffusion.

Said areas of application require an X-ray beam having perfectly defined beam properties in terms of angle distribution (divergence or convergence), space and spectral distribution with strict volume constraints in space (integration into industrial equipment).

The first systems developed to deliver X-rays comprised an X-ray source with micro-focus (of size typically less than 50 micrometers), the source being coupled with an X-ray optic (monochromator for example) allowing special conditioning of the beam emitted by the source. Nonetheless said systems offer limited brilliance, notably on account of the micro-focus source used which is a source with fixed anode (sealed tubes) and therefore do not allow high power operation.

Yet, the performance level of systems delivering X-ray beams for the above-described applications is directly related to the brilliance of the source. The brilliance of a source is defined as the quantity of photons emitted by the source within a unit solid angle in unit time per unit area of the apparent focus of the source, for energies defined by a given spectral width (ph units/s/mm$^2$/mrad2/unit spectral width).

In particular, applications such as protein crystallography (fast rate crystal analysis) or thin layer metrology applications for the fabrication of semiconductors require effective flux levels having a higher order of magnitude than those obtained with X-ray beam delivery systems based on sealed tubes.

It has therefore been proposed to use source/X-ray optic assemblies using sources with rotating anodes. Source-optic coupling for these types of applications is notably described in U.S. Pat. No. 6,823,042.

Prior art sources with rotating anodes integrate electron guns operating at high power (typically from 700 W (Watts) to 2 kW) which, on the X-ray target located on the edge of the rotating anode, focus electron beams in an elongate shape whose smallest dimension typically lies between 70 and 100 micrometers the second dimension typically being 5 to 10 times greater than the small dimension.

The powers used make it possible to obtain satisfactory brilliance for the applications under consideration. However, the anode needs to be cooled to prevent its fusion or sublimation. This is why, in addition to rotation of the anode which limits heating, it is necessary to make provision for a cooling system. Therefore, the system proposed in U.S. Pat. No. 6,823,042 integrates a water cooling system for the rotating anode (by forced convection of a heat exchange liquid inside the anode) with a rotation system with bearings.

It is to be noted firstly that the brilliance of said configuration remains limited since the use of a system with bearings limits the rotating speed and hence the travel speed of the X-ray target under the electron flux.

Additionally, said sources may have problems of reliability which may be caused by leakages at the insulation seals of the cooling system. These leakages may in particular deteriorate the bearings of the motor systems. To overcome such watertight problems, the rotating anodes cooled with water require sophisticated mechanisms (leak detectors for example) such as described in US 2006/0013364 which may require frequent maintenance and/or major additional costs for the system.

Said constraints amount to a major problem for X-ray beam delivery systems integrated in metrology equipment to control semiconductor fabrication methods. For these types of applications only one or two maintenance cycles are planned per year, which additionally are of short duration (a few hours), and any providing of additional maintenance to replace insulating seals on the rotating anode system would lead to a substantial drop in productivity.

One object of the present invention is therefore to propose a device to deliver a high energy X-ray beam for the applications under consideration, with which it is possible to overcome at least one of the above-mentioned disadvantages.

One object of the present invention is more particularly to propose a device enabling a high brilliance beam to be delivered, the system being highly reliable so as to reduce maintenance cycles.

A further object of the invention is to propose a device which allows utilization and operating costs of the device to be reduced.

DESCRIPTION OF THE INVENTION

To achieve these objects, a device is proposed to deliver X-ray beams at energies greater than 4 keV, comprising:
  an X-ray source comprising an electron gun adapted to generate a continuous beam of electrons on a target region of an anode for X-ray emission by the anode,
    said anode forming a rotating part with a diameter of between 100 and 250 millimeters, and being joined to a motor shaft so as to be driven in rotation by a rotation system,
  the electron gun and the anode being arranged inside a vacuum chamber, said chamber comprising an exit window to transmit an X-ray beam emitted by the anode to outside the chamber,
  means to condition the X-ray beam emitted through the exit window, the conditioning means comprising an X-ray optic adapted to condition the emitted X-ray beam for a two-dimensional optic effect,
characterized in that:
  the electron gun is designed to emit a beam of electrons with a power of less than 400 watts, and comprises means to focus said beam of electrons on the target region in substantially elongate shape defined by a small dimension and a large dimension, the small dimension lying between 10 and 30 micrometers and the large dimension being 3 to 20 times greater than the small dimension, the rotating anode comprises an emission cooling system to evacuate, by radiation, part of the energy transmitted by the electron beam to the anode, the system to set in rotation comprises a motor with magnetic bearings designed to cause the anode to rotate at a speed of more than 20 000 rpm, and the exit window is arranged so as to transmit an X-ray beam emitted by the anode, so that the X-ray beam emitted towards the conditioning means is defined by a substantially point-size focal spot whose size substantially corresponds to the small dimension of the shape of the target region.

The presented device allows an X-ray beam to be emitted from the source characterized by a focal spot of quasi-point size (micro-focus). As will be seen further on, this makes it possible to increase the electron power density on the target and hence the brilliance of the corresponding X-ray beam.

In addition, since focusing of the electron beam occurs on a small target region, this permits a reduction in the operating power of the electron gun, and hence the costs of using the system (electricity consumption, $CO_2$ emission). It also limits heating at the anode.

Additionally, the focusing of the electron beam in an elongate shape allows corresponding distribution of heating of the target region.

With the device, it is therefore possible to limit heating of the anode, which allows an anode cooling system to be used which performs less well than a water cooling system in terms of heat evacuation but which is much more reliable, notably for high speed rotation of the anode.

Preferred, but non-limiting aspects of the device to deliver an X-ray beam according to the invention are the following:

the X-ray optic is a single reflection optic;

the X-ray optic is curved along two orthogonal directions so as to produce a two-dimensional optic effect by single reflection;

the X-ray optic comprises a multilayer coating;

the exit window is arranged in the chamber so as to transmit an X-ray beam whose mean direction forms an angle with the mean plane of the target region of between 3° and 20°, preferably between 6° and 12°;

the electron gun is arranged so that the beam of electrons is substantially parallel to the motor shaft;

the electron gun is arranged on the same side as the rotation system;

the anode is of substantially cylindrical shape defined by two circular surfaces forming the bases of the anode, the two surfaces being joined by a side wall forming the edge of the anode, the electron gun being arranged so as to focus the beam of electrons on one of the two bases of the anode;

the anode comprises an inclined portion at the target region so that the X-ray beam is collected by the conditioning means in a mean direction that is substantially perpendicular to the rotation axis of the anode;

the conditioning means are arranged so that the mean direction of the X-ray beam collected by the optic is substantially radial relative to the anode surface;

the electron gun comprises means to focus the electron beam so that the large dimension of the target region is radial relative to the base of the anode and the small dimension lies tangent to the base of the anode; therefore, the electron gun comprises means to focus the electron beam so that the large dimension of the target region is arranged radially relative to the anode and rotation of the anode can occur in the direction of the small dimension;

the conditioning means are arranged so that the inlet of the X-ray optic is placed at a distance from the focal spot of the X-ray source of between 10 and 30 millimeters;

the device comprises means to shut off the X-ray beam, arranged at the outlet of the X-ray optic;

the rotation system to drive the motor shaft comprises a rotor of a turbomolecular pump ensuring a secondary vacuum in at least part of the chamber;

the anode comprises a diamond layer arranged beneath the target defined by the target region;

the anode has a target thickness of less than 5 µm;

the device further comprises means to control the position of the focal spot, and a control system comprising means to move the X-ray optic, the movement means capable of modifying the position of the X-ray optic relative to the focal spot in relation to the variation in position of the focal spot determined by the control means;

the device further comprises an ionization chamber arranged at the outlet of the X-ray optic.

The invention also concerns an X-ray metrology system for samples, comprising a device to deliver an X-ray beam such as described above, characterized in that the device is rotatably mounted about an axis merging with the motor shaft and parallel to a mean plane of the sample.

Provision is also made for an X-ray metrology system for samples, comprising a device to deliver an X-ray beam such as described above, characterized in that the system delivering the X-ray beam is positioned so that the motor shaft of the anode lies substantially parallel to a mean plane of the sample.

DESCRIPTION OF THE FIGURES

Other characteristics and advantages will become apparent from the following description which is solely illustrative and non-limiting, and is to be read with reference to the appended figures amongst which.

DETAILED DESCRIPTION OF THE INVENTION

First, it is to be noted that a monochromatic beam in the meaning of the invention is a beam whose distribution per spectral unit is substantially centred on a characterizing energy (Ec) for which the energy distribution (ΔE) is less than a few percent (ΔE/Ec is less than a few percent). The beam may also comprise no more than 1 to 2% parasitic radiations (other characteristic energies such as the K beta energies of copper and bremsstrahlung which is an intrinsic characteristic of the X-ray target).

Figure 1:
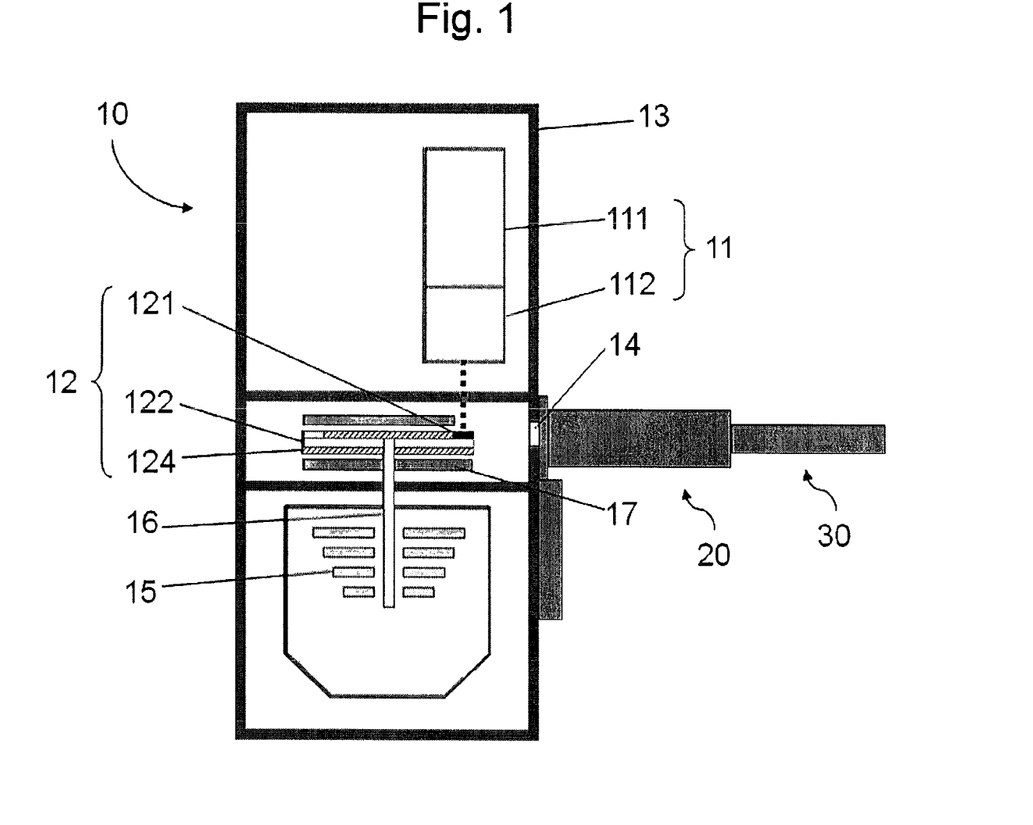
FIG. 1 is a schematic of a device to deliver a high energy X-ray beam according to the invention.

As illustrated FIG. 1, a device is proposed to deliver a high energy X-ray beam (typically more than 4 keV) integrating a continuous emission X-ray source 10, and an X-ray optic 20 to condition the X-ray beam emitted by the source 10, preferably with a two-dimensional optic effect.

This type of source differs from sources with rotating anodes used in the medical sector which are based on a discontinuous operating cycle alternating exposure times (a few seconds) and cooling cycles (a few minutes) needed to evacuate the heat accumulated during the exposure time. These anodes typically use electron powers that are much higher (at times several tens to several hundred kWatts) but operate with discontinuous thermal and mechanical stress on the anode.

In the invention, as in the case of conventional rotating anodes used in the area of X-ray analytical instrumentation, the source 10 operates continuously. The area of application of the invention requires high utilization rates of associated equipment (just-in-time applications such as semiconductor metrology). Also some research applications may require exposure times of samples to X-ray beams which are typically several hours even several days for one same sample (such as for protein crystallography). Even if the user makes a pause or when samples are changed, the X-ray sources are typically maintained at their nominal power or at reduced power (i.e. power reduced by around 80% compared with the nominal power) (a safety shutter positioned at the outlet of the source or of the X-ray optic is then held in closed position to block the emitted X-ray beam).

The X-ray source used with rotating anode emits high energy X-rays adapted for X-ray instrumentation (X-ray diffraction, X-ray fluorescence). By high energy is meant X-ray emission energies of more than 4 keV, and preferably between 4 and 25 keV. The X-ray sources used are typically based on X-ray targets in copper, molybdenum, silver, chromium (generation of X-rays from excitation of K line electrons of these atoms) or tungsten (generation of X-rays from excitation of L line electrons of tungsten).

As already indicated, the performance level (effective flow paying heed to conditions of divergence, spectral purity, and occupied space) of X-ray beam delivery systems for X-ray analytical applications is directly proportional to the brilliance of the source.

The brilliance of the source depends on the density of electron beam power on the target, i.e. the power of the electron beam per unit area of the X-ray target exposed to this beam.

Yet, it is possible to increase the density of electron beam power on the target by reducing the focal spot size of the source with improved thermal dissipation. It follows that the focusing of the electron beam on the target region with an impact shape of small size makes it possible to obtain densities of high power, and to reduce the total effective power of the electron gun which has advantages in terms of system use and environmental costs.

The X-ray source 10 used in the device of the invention consists of coupling a low power electron gun 11 with a rotating anode 12 in a particular arrangement and functioning mode so as to emit an X-ray beam characterized by a point focal spot of reduced dimensions.

The densities of electron beam power obtained with a device conforming to the invention are comparable to, even better than, those of known devices operating at high power. This arises most clearly from Table 1 below.

TABLE 1

| | Power of electron gun | Size of target region (apparent focal spot of the source) | Density of electron power on the target |
|---|---|---|---|
| Known high power device | 2,000 W | 70 μm × 700 μm (70 μm) | 40 kW/mm² |
| Embodiment 1 of the invention | 300 W | 30 μm × 300 μm (30 μm) | 33 kW/mm² |
| Embodiment 2 of the invention | 200 W | 20 μm × 200 μm (20 μm) | 50 kW/mm² |
| Embodiment 3 of the invention | 100 W | 10 μm × 100 μm (10 μm) | 100 kW/mm² |

Therefore, the proposed source 10 can be particularly competitive in terms of brilliance, even though the required electron beam powers are 6 to 20 times lower.

It is to be noted that, while brilliance is a determinant parameter of the system delivering an X-ray beam, the choice of adapted source size is also strongly dependent on the efficiency of the associated X-ray optic element. Each application is effectively associated with optimal or permissible flux distribution in space, angle space, and in the spectrum. Therefore, efficient optical elements are required to achieve the necessary beam transformation.

The invention notably applies to priority areas of application, which are detailed below, and to associated source-optic couplings.

Power of the Electron Gun and Anode Sizing

According to the invention, the source 10 comprises an electron gun 11 comprising a cathode 111 and focusing means 112 allowing an electron beam to be focused on a target region 121 of a rotating anode 12. The anode 12 and the electron gun 11 are placed in a vacuum chamber 13.

As already indicated, the electron gun 11 is designed to operate at low power, typically less than 400 watts (W). It is specified that this power corresponds to the power of the electron beam impacting the anode. The electron gun 11 comprises a cathode 111 emitting an electron beam of given cross-section.

The electron gun 11 includes focusing means 112 for the electron beam extracted from the cathode 111, to focus the electron beam on a target region 121 of the anode 12 in a particular shape. More precisely, the shape of the target region 121 is substantially elongate (elliptical for example), which allows better distribution of the energy transmitted by the electron beam at the target, and hence better distribution of corresponding heating.

Figure 3:
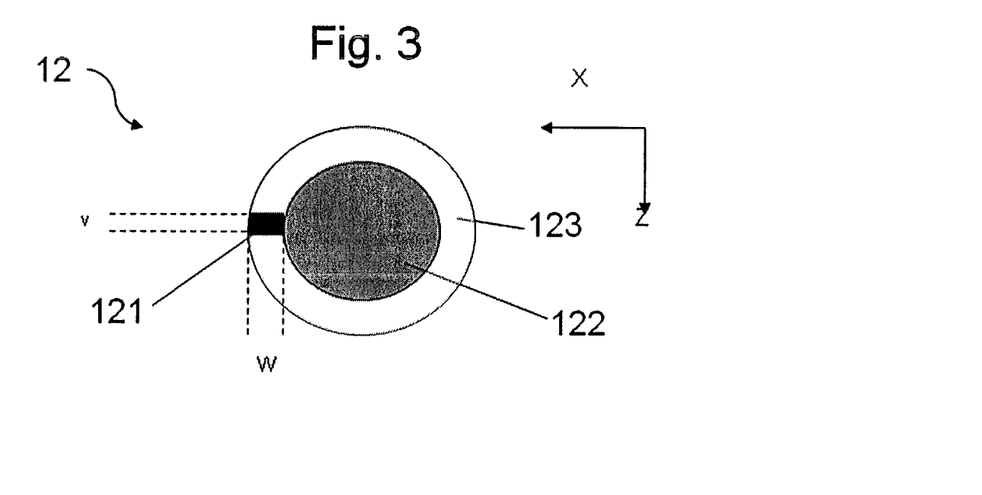
FIG. 3 is an overhead view of the anode showing the target region.

The elongate shape of the target region can be globally characterized by a small dimension (v) and a large dimension (W) (see FIG. 3). These dimensions may for example correspond to the short axis and long axis respectively if the shape is elliptical. The small dimension is typically chosen to be between 10 and 30 micrometers (μm), the large dimension possibly being 3 to 20 times larger than the small dimension.

Since the anode 12 is driven in rotation, the corresponding target 123 on the anode is more extensive than the focusing target region 121 of the electron beam. This target 123 is typically ring-shaped as can be seen FIG. 3. The target preferably has a surface corresponding to the effective surface generated by the shape of the target region 121 and rotation of the anode 12. Provision may also be made, however, for a target 123 of greater size, with a ring width that is greater than the width of the target region 121, so as to facilitate placing the target 123 on the target support 122. In one particular embodiment, the target 123 and the support 122 are merged, so that the anode assembly 12 could serve as target. As already mentioned above, the target 123 is formed of a material adapted to the desired X-ray characteristics.

Preferably, the anode 1 forms a rotating part with a diameter of between 100 and 250 mm. For example, an anode 12 can be used having a substantially cylindrical shape defined by two circular surfaces forming the bases of the anode, the two surfaces being joined by a side wall forming the edge of the anode. In this case, the X-ray target 123 is typically in the form of a ring arranged on the periphery of the anode (see FIGS. 2a and 3). According to another embodiment, the anode 12 has a sloped peripheral surface as illustrated FIG. 2b. According to one embodiment, this sloped portion is formed by the geometry of one of the surfaces forming the bases of the anode. According to another embodiment, the anode is formed so that the edge of the anode forms said sloped portion.

The centre of the X-ray target which will effectively be exposed to the electron beam may be positioned close to the edge of the anode (typically at a distance of less than 10 mm) so that it is possible to minimize the distance between the focal spot characterizing the X-ray beam emitted by the source and the X-ray optic, for the purpose of increasing the collection angle of the optic.

The impact of the electron beam on the target of the anode 12 leads to emission of X-rays in all directions from the surface of the anode 12.

Provision is made for an exit window 14 arranged in the chamber 13 to allow transmission of an X-ray beam, this X-ray beam being characterized by a mean direction of propagation. The exit window may be a beryllium window for example.

The term take-off angle $\alpha$ is used to designate the angle formed by the mean direction of the X-ray beam passing through the exit window and collected by the X-ray optic, with the mean plane of the target region from which the X-ray beam is derived.

Figure 2A:
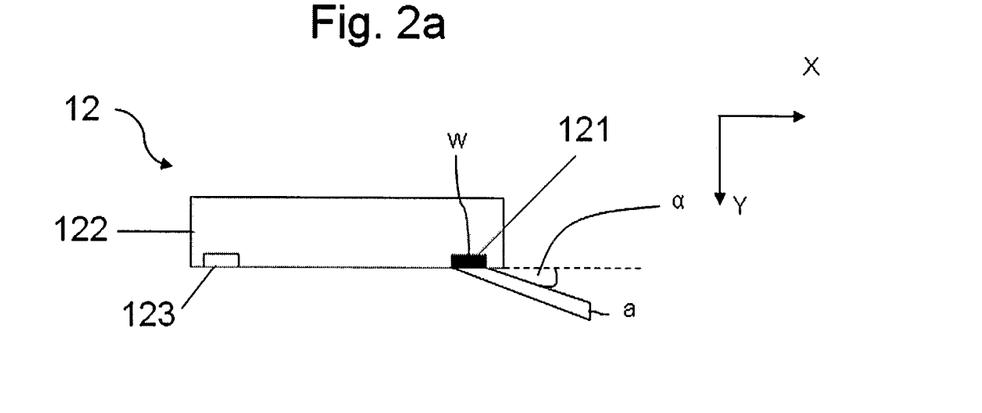
FIG. 2a is an illustration of the take-off angle defined with respect to the target region of an anode of cylindrical shape.
Figure 2B:
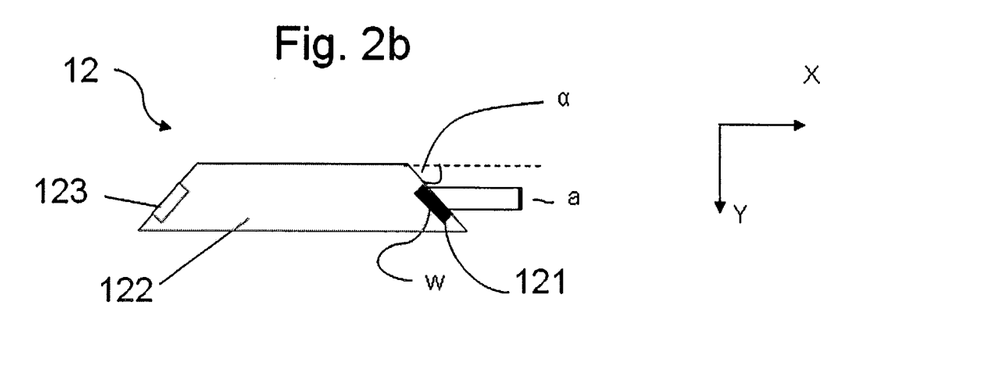
FIG. 2b is an illustration of the take-off angle defined with respect to the target region of an anode of cylindrical shape with an inclined peripheral rim.

FIGS. 2a, 2b, and 3 illustrate the take-off angle $\alpha$ and the reduction factor of the large dimension (W) of the target region for collection at said angle. The apparent size of the focal spot of the source for the optic positioned downstream corresponds to size (a).

The use of a take-off angle $\alpha$ of between 3° and 20° makes it possible to obtain a substantially point focal spot of apparent diameter (a) for the optic assembly placed downstream of the source from an X-ray region area illuminated by the electron beam under an elongate profile with a large dimension (W) and a small dimension (v). The use of this grazing take-off angle is critical for the area of application of the invention since it allows an X-ray beam to be obtained which leaves the X-ray source characterized by a quasi-point focal spot from a target region of elongate shape.

It is to be noted that the take-off angle $\alpha$ has an impact on the intensity of the X-ray beam which can be collected by the two-dimensional optic assembly 20. The intensity emitted by a point of the target varies according to the take-off angle (the emitted intensity increases with the take-off angle, this intensity reaching a threshold value from a take-off angle in the order of 10° to 20° depending on the energy under consideration and the target material). A take-off angle lying between 3° and 20° ensures a good compromise between the intensity of the beam emitted by the target 121 and the reduction in the emission region ensuring a substantially point focal spot for the optic 20 and good distribution of heat load on the surface of the target. According to one preferred application of the invention, the optic assembly 20 is arranged downstream of the source at a take-off angle of between 6° and 12°, which ensures a reduction in the large dimension W of the target region by a factor of between 5 and 10.

It is to be noted that a take-off angle of 15° to 20° (small reduction of large dimension W) may be given priority if focusing of the electron gun 11 is difficult and does not allow an electron beam to be obtained having a section with strong asymmetry (e.g. 30 µm by 300 µm). In this case, preference is to be given to lesser asymmetry of the electron beam, whilst increasing the density of the electron beam to maintain a high brilliance level.

As illustrated FIG. 2b, the take-off angle $\alpha$ may be obtained via a local incline of the anode 12 at the target 123. This incline $\alpha$ of the target allows the X-ray beam to be collected downstream of the source in a direction substantially perpendicular to the axis of rotation.

The particular focusing of the electron beam on a small-size target region of elongate shape, and the particular positioning of the exit window allows a source to be obtained emitting an X-ray beam characterized by a source focal spot of apparent point-size for the X-ray optic placed downstream of the source.

There is heating at the target region 121 of the anode 12, even if heating is limited by the elongate shape of the target region, and by the low power of the electron beam.

First, the anode 12 must be driven in rotation at high speed. A high peripheral speed can limit the peak temperature of the X-ray target (the peak temperature being the temperature reached by the X-ray target after passing under the electron flow). This temperature must be lower than the melting point of the target material under consideration, and lower than the sublimation temperature at the pressure of the vacuum chamber under consideration (which is typically between $10^{-6}$ mbar and $10^{-7}$ mbar).

Table 2 gives the heating (temperature increment due to passing under the electron flow) calculated as a first approximation for a configuration of the invention at a peripheral speed of 280 meters per second (m/s) (200 W, 20 µm×200 µm, speed of 35,000 rpm with an anode of diameter 150 mm), and shows a comparison with a conventional source configuration (1,200 W, 70 µm×700 µm, speed of 12,000 rpm with an anode of diameter 100 mm).

TABLE 2

| | Power of electron gun | Size of target region | Estimated temperature increment ΔT |
|---|---|---|---|
| Known high power device | 1,200 W | 70 µm × 700 µm | 820° C. |
| Embodiment 2 of the invention | 200 W | 20 µm × 200 µm | 184° C. |

The calculation of increment for the embodiment of the invention was made taking into account a heating depth of 6

μm. With respect to the high power device cooled with water, the formula in FIG. 14 of patent application U.S. Pat. No. 6,823,042 was applied.

As indicated in the above results, the temperature increment is lower than for known sources (no sudden heat stress cycle).

For use of peripheral speeds in the order of 200 m/s or more, the invention comprises a motor with magnetic bearings 15 setting in rotation the motor shaft 16 supporting the rotating anode 12 at frequencies of more than 20,000 rpm, the rotating anode having a size of between 100 and 250 mm.

The use of said motor further provides the guarantee of increased stability of the system, since the motor with magnetic bearings limits the transmission of any vibrations to the anode. This type of motor is all the more advantageous since the rotation speed of the anode is higher.

It is also appropriate to use a cooling system to provide additional cooling of the anode 12.

For this purpose, it is proposed to use a cooling system by emission to evacuate, by radiation, part of the energy transmitted by the electron beam to the anode 12. The cooling system may typically consist of emissive surfaces 124 corresponding to the surface of the target support 122 or to emissive coatings arranged on the target support 122 making it possible via radiation to evacuate a large part of the power of the electron gun which will be absorbed by a surface or part 17 arranged facing the anode 12, this surface or part 17 being cooled with water (cooling by forced convection of a heat-exchange liquid inside the part).

The use of an anode of size between 100 and 250 mm allows a sufficient surface to be obtained to evacuate a maximum power in the order of 300 Watts from an emissive surface 124 held at a suitable temperature (between 300 and 600° C.) and grouping together a large part of the anode.

Provision may also be made to arrange heat insulation elements between the motor shaft 16 and the support 122 to avoid overheating of the motor shaft 16. It is to be noted that, despite the integration of an insulating part between the shaft and the rotating anode, a power in the order of a few tens of Watts can be transmitted to the motor shaft.

The X-ray target is typically arranged on a support 122 consisting of a material with high mechanical and thermal resistance (creep resistance). The anode block assembly is defined so as to limit stress from the magnetic bearings.

To illustrate the thermal behaviour of the rotating anode such as considered in the invention, Table 3 identifies variations in mean temperature (Tmean) on the surface of an anode comprising a copper target, and variations in peak temperature (Tpeak) in relation to anode size (the anode corresponds to a cylinder of the diameter specified below and hollowed as per a cylinder of diameter 50 mm) for a rotation frequency set at 30,000 rpm. Copper is given by way of illustration on account of its melting point which is relatively low (compared with refractory metals such as tungsten and molybdenum).

Table 3 gives an estimated temperature increment and estimated mean temperature on the surface of the anode necessary to evacuate a given power in relation to anode surface.

TABLE 3

| Diameter of the anode (mm) | Mean temperature (° Kelvin) | Peak temperature (° Kelvin) | Linear speed (m/s) |
|---|---|---|---|
| 200 | 556 | 710 | 314 |
| 150 | 638 | 843 | 236 |
| 90 | 837 | 1179 | 141 | in which:
Tmean corresponds to the temperature on the surface of the anode which, at equilibrium, allows evacuation of 300 Watts with an emissive surface having high radiating powder (high emissivity (e) set at 0.9) and a surface S (S varying according to the diameter of the anode), and Tpeak being the maximum temperature reached by the copper target after passing under the electron flux.

System Setting the Rotating Anode in Rotation

As indicated above, the rotating anode 12 is preferably set in rotation by a motor shaft sub-module 16 whose motor 15 allows fast rotation at frequencies greater than 20,000 rpm.

According to one particular embodiment of the invention, the motor and the driving system are sealed via an impervious wall. Pumping of the X-ray source is ensured by a secondary pump attached to a primary pump.

According to another embodiment of the invention, the rotating anode 12 is set in rotation by the motor shaft of a turbomolecular pump to cause the anode to travel under the electron flow emitted by the electron gun 11, whilst driving the rotor of the turbomolecular pump for the purpose of producing a secondary vacuum in the vacuum chamber of the X-ray source. It is to be noted that the vacuum pump which is used to set the rotating anode in rotation is preferably of turbomolecular pump type with magnetic bearings.

Rotating Anode Disc

Figure 4:
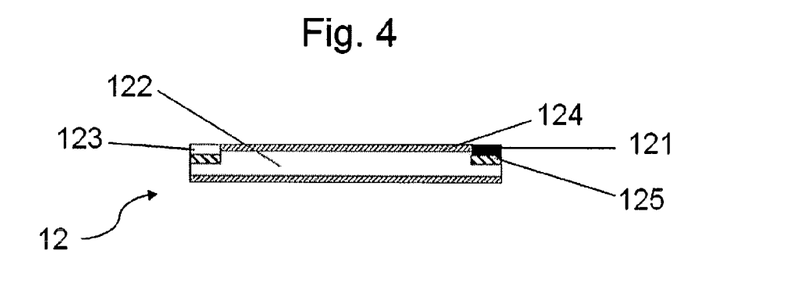
FIG. 4 is a cross-sectional view of an anode according to one particular embodiment.

As illustrated FIG. 4, and according to one particular embodiment, the rotating anode 12 consists of a disc consisting of the following elements:

an X-ray target (121) intended to emit X-rays with characteristic energy under excitation by the electron flux (for example X-rays of the characteristic Copper K alpha ray), a support structure (122) (disc or other rotating part) with sufficient thermal conductivity to dissipate the heat over a large surface, and an emissive surface (124) (coatings or surface of the support structure) on the surface of the anode (dissipating the heat by infrared emission) towards static cooling elements arranged facing the anode.

In addition, provision may be made to insert in the anode a sub-layer with very high thermal conductivity (125) underneath the target (121) to allow additional evacuation of the heating of the target (121) (to reduce the mean temperature and peak temperature of the target (121)).

When the target passes under the electron beam, the target effectively undergoes local heating which may be of several hundred degrees (even if this is reduced compared with conventional rotating anodes). Having regard to the high mean temperatures of the anode resulting from cooling by radiation, it may be advantageous to arrange under the target a layer with very high thermal conductivity to increase the heat evacuation capacity of target notably during exposure of the target to the electron flux.

According to one preferred application of this embodiment, the sub-layer with high thermal conductivity 125 is a diamond layer. Diamond has the advantage of having very high thermal conductivity (which may be 5 times greater than that of copper which is one of the materials with the highest thermal conductivity amongst the target materials used).

If this sub-layer with high thermal conductivity is used, a very thin thickness of the target (121) is to be sought so as to maximize the thermal energy evacuated during the exposure time. Typically a target thickness of the order of 10 μm is to be sought, whereas, in prior art X-ray sources, the target thickness is typically of the order of 100 μm (for reasons of ease of implementation).

It is to be noted that the depth of X-ray emission in the target is typically between 3 and 5 μm (depending on materials) for acceleration voltages of electrons in the electron gun of 50 to 60 kV.

A compromise could be sought between the intensity of the emitted X-ray beam and the heating of the target, in particular using a reduced target thickness relative to the effective depth of X-ray generation in the target. The seeking of said compromise could be particularly advantageous if a diamond layer is used having high thermal conductivity and which will not generate critical parasitic radiation for the system delivering high energy X-ray beams. By reducing the size of the target, part of the sub-layer can be exposed to the electron flow. Under the impact of an electron beam, a diamond layer essentially only emits low energy X-rays (in the order of 300 eV) which moreover are absorbed in air or filtered by the optic element 20. When seeking said compromise, a target (121) of thickness typically less than 5 μm can be used.

It is to be noted that the presented systems for setting in rotation at high speed have a heat evacuation capability at the shaft which remains limited, and cannot therefore reach temperatures of more than 100° C. or 150° C. Therefore, according to one preferred embodiment of the invention, the rotating anode or the rotating anode structure is connected to a thermal insulation element with low thermal conductivity (insulator element having a conductivity of no more than a few W/m·K) positioned between the anode 12 and the motor shaft 16.

Figure 5:
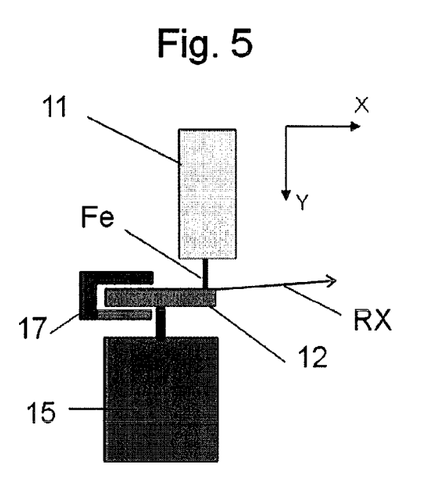
FIG. 5 is a schematic of the X-ray source according to one embodiment of a so-called parallel configuration.
Figure 6:
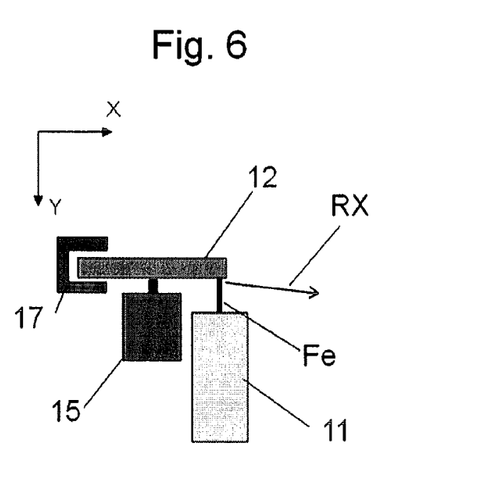
FIG. 6 is a schematic of the X-ray source according to another embodiment of a so-called parallel configuration.

Parallel Positioning of the Electron Gun Relative to the Rotation Axis of the Anode According to one particular embodiment of the invention, the electron gun 11 is positioned in a so-called parallel configuration, so that it is able to focus an electron beam (Fe) onto the base of the anode as illustrated FIGS. 5 and 6, and not onto the edge of the anode 12 as is generally the case for X-ray sources used in the analytical sphere.

In this respect, the axis of the electron gun 11 may therefore lie substantially parallel to the rotary shaft 16 of the rotating anode 12. Normal incidence of the electron gun 11 relative to the target maximizes the yield of X-ray generation.

It is to be noted that the electron gun 11 may be tilted a few degrees to a few tens of degrees relative to the rotary shaft 16 of the anode 12. Said configuration may be given priority if it is desired to have an electron beam of more symmetrical dimensions (which may be simpler in terms of implementation of the electron gun and its focusing means) but with high electron density. The angle of the electron beam will then ensure exposure of the target region (121) in a desired elongate shape to minimize heating of the target.

According to one particular embodiment illustrated FIG. 6, the gun 11 is also positioned so that the electron beam (Fe) is parallel to the rotary shaft 16 of the rotating anode 12, but the electron gun 11 is positioned on the side of the rotation system 15. According to this embodiment, the rotating anode 12 needs to have a larger diameter than the base of the rotation system 15 to allow integration of the electron gun 11 on the side of the rotation system 15 relative to the plane of the rotating anode 12.

For this configuration, a rotating anode is therefore chosen of larger diameter than the diameter of the rotation system 15 making it possible to place the rotation system side by side with the electron gun. Typically, the anode may have a diameter of 200 mm for a gun and rotation system 15 having a diameter of around 100 mm.

With said configuration, it is possible to improve the compactness of the source block and also to reduce the weight of the device. Having regard to the dimensions of the electron beam required on the target, the electron gun may have a relatively elongate shape (of several tens of centimeters) to ensure the necessary focusing, which leads to a long source length (the length being determined along direction Y).

In addition, if the rotating anode 12 is set in rotation by the motor shaft of a turbomolecular pump, the heat evacuation of the anode by radiation may require a large anode diameter compared with the pump diameter required for pumping the system or the part of system under consideration. This is notably the case when the electron gun requires own pumping and the pump setting the anode in rotation solely ensures pumping of that part of the chamber containing the anode. Own pumping of the electron gun may in particular be necessary for certain electron gun technologies requiring a large vacuum (in the order of $10^{-7}$ mbars) such as electron guns containing impregnated cathodes or with LaB6 filament.

The configuration illustrated FIG. 6 can notably be given preference to limit the asymmetry of the source block and to reduce the dimension in vertical direction (i.e. in direction Y) to obtain a source block having a size in the order of 30 cm$^3$.

Additionally, this solution allows the passing of cables (high voltage cables of the electron gun, connections of the turbomolecular pump with the primary pump) on only one side (the side of the rotation system and electron gun). Therefore, the integration of the device in X-ray diffractometers or XRF spectrometers is made simpler.

It is to be noted that, if the electron gun is oriented parallel, it will be sought that the elongate dimension (W) of the target section exposed to the electron beam is arranged radially relative to the anode, and the smallest dimension (v) is arranged in a direction substantially tangent to the surface of the anode (and hence perpendicular to the axis of rotation). Said configuration is illustrated FIG. 3. It allows the anode to be set in rotation in the direction of the smallest dimension of the target, making it possible to reduce the temperature increment of the target when it passes under the electron flow.

As already indicated, the collection of the X-ray flux is ensured by an exit window (typically consisting of a beryllium window) through which the X-rays are emitted which are to be collected by the X-ray optic.

Regarding the orientation of the electron beam on the target (i.e. with focusing on the base of the anode) it is generally sought to collect X-rays in a substantially radial direction relative to the surface of the anode (to maintain a grazing take-off angle for the purpose of reducing the elongate dimension W). The X-ray collecting direction may be inclined at an angle a relative to the radial direction (as illustrated FIG. 2a).

It is to be noted that, with an optic having a high capture angle β in a dimension in space i.e. with angle β typically of several degrees (such as for multilayer X-ray optics producing a two-dimensional effect by single reflection, or double-curved crystals), a preferred orientation of the optic is defined so as to ensure a relatively homogeneous distribution of photon flow at the input to the optic. The application of this preferred orientation will be notably more critical if the take-off angle α is small (for example 3° to 6° compared with a take-off angle of 20°).

Figure 7:
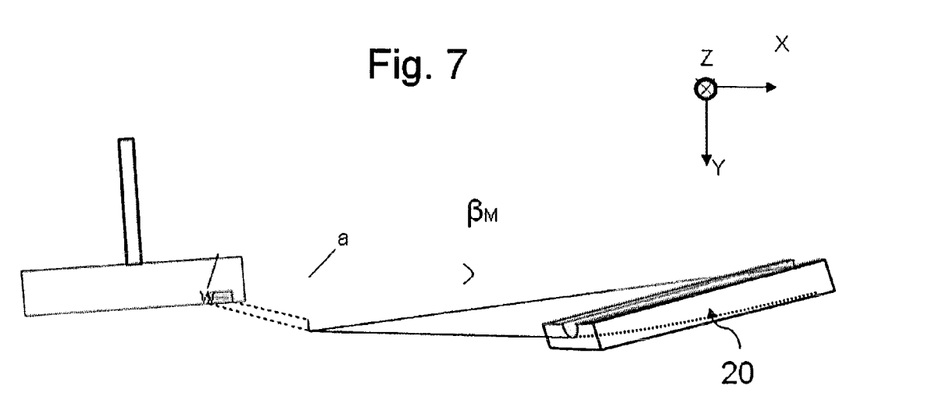
FIG. 7 is a schematic of a device to deliver a high energy X-ray beam according to the invention illustrating the collection angle of the optic along the meridional direction.

Said preferred orientation may particularly be sought for a multilayer optic with single reflection in which the capture angle of the optic in the sagittal direction ($\beta_S$ in FIG. 8) may be greater than the capture angle in the meridional direction of the optic ($\beta_M$ in FIG. 7).

Figure 8:
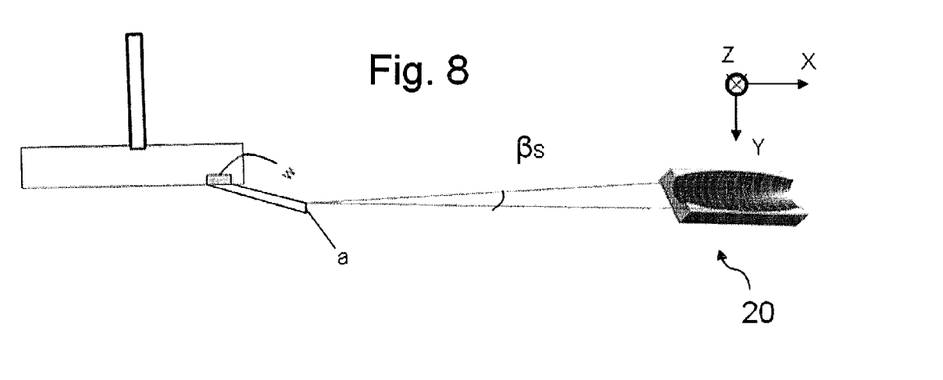
FIG. 8 is a schematic of a device to deliver a high energy X-ray beam according to the invention, illustrating the collection angle of the optic along the sagittal direction.

The optic assembly will then be oriented in a horizontal position (as illustrated FIG. 7) in which the beam section comprising the greatest angle distribution (i.e. the section for which the angle distribution is $\beta_S$) is substantially parallel to the plane of the X-ray target. This position is to be distinguished from the vertical position as illustrated FIG. 8 in which the beam section comprising the greatest angle distribution (i.e. the section for which the angle distribution is $\beta_S$) is substantially perpendicular to the plane of the X-ray target. In reality, the planes are slightly inclined on account of the take-off angle with a rotating anode comprising a target 123 which is not inclined relative to the surface of the anode (as illustrated FIG. 2a). The mean direction of the capture angle of the optic merges with the mean direction of the X-ray beam defined by the take-off angle (it is specified in this respect that FIGS. 7 and 8 are figures intended to illustrate the collection angles of the X-ray optic 20 in the two directions in space, and that the illustration of the mean direction of the X-ray beam collected by the optic does not conform to reality in which this direction is substantially aligned with the take-off angle α).

Horizontal positioning of the optic (as illustrated FIG. 7) can ensure that there is no major variation in the intensity of the focal spot for the optic placed downstream of the source, which globally permits the flux leaving the optic to be increased.

Source-optic Coupling

The X-ray beam delivering device integrates a source such as described above coupled with a conditioning element comprising an X-ray optic adapted to produce a two-dimensional optical effect, such as focusing or collimation of the X-ray beam emitted from the source in the two dimensions of space transverse to the mean direction of propagation of the X-ray beam.

This X-ray optic may therefore be a polycapillary optic or an optic of monochromator type. According to one preferred embodiment of the invention, notably for monochromatic applications, the X-ray source is coupled with an optic having a multilayer coating or a crystal curved in two dimensions.

It is found that the coupling of the source with an optic having a two-dimensional effect through single reflection is extremely advantageous. Said optic effectively allows the intensity loss of the X-ray beam to be limited, since it enables a two-dimensional optic effect to be obtained with a single reflection.

In addition, a collimator 30 may be provided at the outlet of the X-ray optic.

Use of the X-ray Beam Delivering Device for Applications with Monochromatic Collimating Beam Some applications with high angle resolution, such as SAXS applications (Small Angle X-ray Scattering) or high resolution diffraction applications require a collimating monochromatic beam i.e. with a divergence in the order of 0.5 to 1 milliradian.

Said beam properties can be obtained by coupling a microfocus source with an optic with multilayer coating, and with two-dimensional effect. The optic may be a single reflection optic, or a multilayer optic with a configuration of Kirkpatrick Baez or Montel type in which double reflection is necessary to obtain a two-dimensional optic effect.

It is to be noted that developments in fabrication techniques of X-ray optics have brought a reduction in shape errors. It is therefore possible, using a single reflection multilayer optic in the shape of a portion of paraboloid of revolution, to collimate a beam derived from a point source with only a small contribution to residual divergence resulting from shape errors of the optic.

The use of a source with smallest focal spot makes it possible to reduce the residual divergence due to the size of the source. Residual divergence of a source is given by $$\frac{d}{p - \frac{L}{2}}$$

in which p is the distance between the focal spot of the X-ray source and the centre of the optic, L is the length of the optic and d, the size of the apparent source collected by the optic.

With the use of a source of reduced size, the optic can be brought closer to the source and the size of the optic can be reduced (which allows the $$p - \frac{L}{2}$$

factor to be reduced), without too much increase in residual divergence. By placing a small-size optic very close to the source, it is also possible to reduce the size of the beam leaving the optic for a given capture angle (and hence a given flux).

The coupling according to the invention therefore allows flux density to be increased for high angular resolution applications, by obtaining a beam of reduced size at the outlet of the optic, compared with a configuration based on a source with a greater focal spot size (100 μm).

It is specified that, for a collimating optic, the size D of a collimating beam leaving the optic is given by $$\beta = \frac{D}{p - \frac{L}{2}}.$$

The capture angle β is typically limited for multilayer optics using symmetrical divergences at values in the order of 1.5° (typical values for optics reflecting Copper Kα and Molybdenum Kα energies). For relatively short working distances between the optic and the sample, for which residual divergence of the beam leaving the optic does not increase spot size, D can be considered as being the size of the beam on the sample.

The invention is particularly advantageous for applications requiring a collimated beam with strong flux density or a high flux on a sample spot of less than one millimeter and in the order of a few hundred micrometers.

By way of example, for high resolution diffraction applications requiring a monochromatic beam of 400 μm and taking into account the maximum capture angle of optics with multilayer coatings, which is in the order of 1.5°, the minimum positioning distance of the optic input can be calculated relative to the focal spot of the source, which is around 2 cm. For required beam divergences in the order of 1 milliradian and taking into consideration this source-optic distance, a maximum source size of 20 μm is calculated.

The invention therefore advantageously applies to high angular resolution applications requiring a beam with divergence of between 0.5 and 1 milliradian on a sample of size between 100 μm and 1 mm. According to one preferred application of the invention, the source size (i.e. the apparent focal spot of the source seen by the optic) is between 20 and 30 μm, and the X-ray optic is positioned at a distance of between 2 and 5 cm (distance between the focal spot of the X-ray source and the inlet of the X-ray optic).

Use of the Monochromatic X-ray Beam Delivering Device with Symmetrical Convergence for Monocrystal Diffraction Applications or for Thin Film X-ray Diffraction Applications.

The invention can be advantageously used for applications requiring a monochromatic beam having symmetrical convergence in the order of 0.2° to 0.3°, for sample sizes ranging from 30 to 200 µm. These may concern protein monocrystals or test regions on silicon wafers.

The X-ray beam delivering system then comprises an optic with focusing multilayer coating. According to one preferred application of the invention, this optic may be a single reflection optic with toroid or ellipsoid of revolution shape for example, and a gradient multilayer coating.

The effective flux F on a sample of given dimension D for a source-optic assembly integrating a point source and an ideal focusing optic (with no shape aberration and with optimized reflectivity) in two dimensions is given by the formula: $F=B\times\gamma^2\times D^2$ in which B is the brilliance of the source, $\gamma$, the convergence of the beam leaving the optic.

It is to be noted that the maximum capture angle $\beta$ for multilayer optics with symmetrical convergence is in the order of 1.5° (limits on gradients of multilayer coatings to maintain Bragg's law on the surface of the mirror).

The X-ray beam delivering system according to the invention permits an increase in effective flux for the convergence applications specified above (i.e. convergence of symmetrical beams in the order of 0.2 to 0.3°). As an example of diffraction applications with a required convergence of 0.3° for a sample of 150 µm, the invention can be applied using an optic of magnification 5. The size of the required source is therefore 30 µm. It is specified in this respect that, for applications requiring focusing over a distance of 20 to 30 cm relative to the optic, the centre of the optic must be positioned at a distance of between 4 and 6 cm from the focal spot of the X-ray source. The system, such as claimed, will therefore achieve a gain in effective flux proportional to the gain in brilliance of the source.

The invention will have a particular advantage for diffraction applications on samples of 30 to 50 µm, for which optics with small magnification can be used.

Use of the X-ray Beam Delivering Device with Asymmetric Convergence or Divergence The invention particularly applies to X-ray diffraction applications requiring a monochromatic beam with asymmetric convergence (i.e. with an asymmetry of factor 2 or more) necessitating a beam section of around 30 to 100 µm at the sample (the sample typically being placed at a distance of around 20 to 30 cm).

For these types of application, the X-ray beam delivering system is typically coupled with a single reflection optic with multilayer coating or double-curved crystal. The invention proves to be particularly advantageous in that the use of a small-size source with low residual divergence allows efficient use of the defining slots at the output of the optic (the definitions lots being used to define asymmetric divergence).

Use of the X-ray Beam Delivering Device for X-Ray Metrology Applications

According to one particular embodiment, the delivery device is used for X-ray metrology applications which may require angle variations of the X-ray beam emitted by the source with respect to a sample held in horizontal position (such as a silicon wafer for example). This may be particularly the case in X-ray metrology applications for the fabrication of semiconductors integrating different measurement capabilities for one same sample, for example:

X-ray reflectometry with grazing incidence relative to the sample, or X-ray diffraction with oblique incidence (in the order of a few tens of degrees) for texture analysis.

Typically for these applications, the silicon wafer is held in horizontal position (it may be moved in translation).

Since the wafer cannot be tilted, the incidence of the X-ray beam arriving on the wafer needs to be modified so that it is possible to perform the different required measurements needing different beam incidences.

For this purpose, it is proposed to position the device so that the axis of rotation of the anode is substantially horizontal, more precisely so that this axis of rotation is substantially parallel to the mean plane of the wafer.

Also, the device is mounted mobile in rotation about this same axis of rotation so as to allow rotation of the device assembly. The particular configuration of the device of the invention according to which the electron gun is positioned so that it is able to focus an electron beam on the base of the anode makes it possible, through rotation of the X-ray delivery device about the axis of rotation of the anode, to modify the incidence of the beam striking the wafer to be treated (as illustrated FIG. 9).

This configuration has particularly advantageous application if the anode (12) comprises a target (123) that lies at an angle relative to the anode surface at the desired take-off angle for the X-ray beam collected by the X-ray optic (case in FIG. 2*b*). The setting in rotation of the device around the axis of rotation of the rotating anode, if the X-ray beam is perpendicular to the axis of rotation, allows better control over the angle of incidence on the sample.

This is particularly advantageous since this configuration does not modify the inertia of the motor shaft and of the rotating anode, and therefore does not place stress on the rotation means for the rotating anode, and in particular the magnetic bearings, by modifying the angle of the beam relative to the horizontal sample.

The axis of rotation of the rotating anode effectively does not need to be inclined relative to an original angle of incline when a change in configuration is made corresponding to different angles of incidence of the X-ray beam on the sample.

Figure 9:
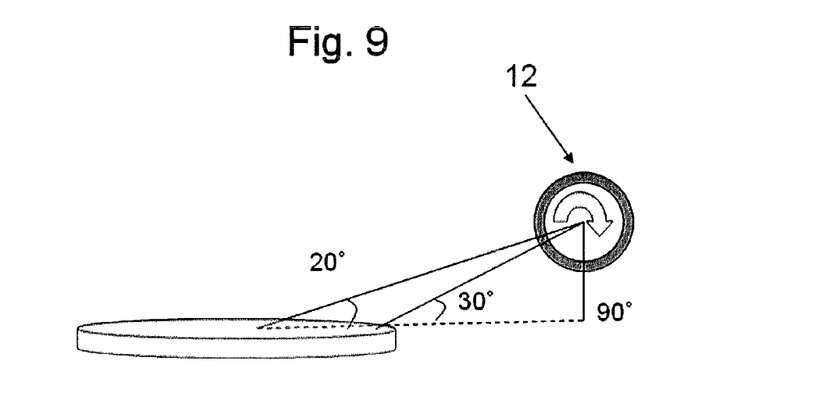
FIG. 9 is a schematic of the horizontal use of the device in which the X-ray source is arranged in a parallel configuration, for a use in which it is possible to cause the angle of incidence of the X-ray beam to vary on a sample also arranged horizontally.

Therefore, to ensure the variations in angle of incidence illustrated FIG. 9, it is notably possible to cause the X-ray beam delivery system to rotate about the axis of rotation of the anode 12. Said arrangement coupled with the so-called parallel configuration described above makes it possible not to modify the inertia of the anode, contrary to what might be needed for an orthogonal configuration in which the electron gun lies in orthogonal position with respect to the rotation axis of the target.

It is to be noted that adjustment of the incidence of the X-ray beam by rotation about the axis of the motor shaft must be accompanied by translation of the X-ray beam delivery system in order to adjust the distance between the optic and the wafer. This additional movement in translation of the X-ray beam delivery system relative to the wafer may also be carried out at wafer level by movement of the wafer.

X-ray Beam Delivery System with Control of Optic Adjustment

As indicated above, the X-ray beam delivery system may be intended for X-ray metrology applications in the semiconductor industry. This gives rise to a major spatial stability constraint at the source (spatial stability being similar to variations in the position of the focal spot of the source) in order to hold the beam stable with respect to a region of the sample. Therefore, the spatial stability that is typically sought for the position of the focal spot from the source will be a few micrometers.

Yet the X-ray beam delivery system under consideration in the invention integrates a rotating anode set in rotation at very high frequencies (higher than 20,000 rpm as indicated above). In addition, on account of anode cooling by emission, the mean temperature of the anode is continuously held at a high temperature (typically a few hundred degrees). As a result, the X-ray source is subjected to creep constraints which may lead to variations in the position of the focal spot over the long term.

Also, having regard to the high rotation speeds, vibrations may be generated in the system leading to slight misalignment of the electron beam relative to the target. In addition, wear of the cathode of the electron gun may cause misalignment of the electron gun over the longer term.

To compensate for said variations in source position, the X-ray beam delivery system such as considered in the invention integrates a control system capable of controlling one or more parameters of the beam leaving the system, of calculating the appropriate command to be applied to at least one actuator, this actuator being a motorized adjustment means of the X-ray optic placed at the outlet of the source so to compensate for variations in position of the source.

More particularly, the actuator consists of means to move the optic assembly along a given axis. The system such considered in the invention may comprise two actuators corresponding to two motorized adjustment means of the optic assembly (along an axis Y and an axis Z as illustrated FIGS. 7 and 8).

According to one preferred application of the invention, the X-ray beam delivery system integrates a single reflection mirror which makes control over spatial adjustment of the beam easier, quicker, and more efficient compared with a system integrating an X-ray mirror with 2D effect of Kirkpatrick-Baez or Montel type.

Depending on the type of variation in the source, which may be rather more one-dimensional, the system such as considered in the invention may use a single actuator i.e. a single motorized adjustment (i.e. along a single axis) to adjust the position of the optic.

Also, even with two-dimensional adjustment, the procedure for aligning the single reflection mirror is more efficient than with a double reflection mirror.

If the controlled critical parameter is flux, the X-ray beam delivery system may include an ionization chamber, as close as possible to the point image. This ionization chamber may therefore be included in the beam delivery system. If the X-ray beam delivery system integrates a collimator at the optic outlet, the ionization chamber may be positioned in the collimator between the optic and the exit window of the collimator.

If the controlled critical parameter is the position of the spot on the sample, the control unit of the beam delivery system may be connected to a microscope display system, periodically displaying the fluorescence generated by the X-ray beam on a calibration fluorescent specimen which may be part of a wafer if the system is intended for semiconductor metrology equipment.

The reader will appreciate that numerous modifications may be made without materially departing from the novel teachings and advantages described herein. Therefore, any modifications of this type are to be incorporated within the scope of the high energy X-ray beam delivery device described in the foregoing, and its uses.

The invention claimed is:

1. A device to deliver an X-ray beam at energies greater than 4 keV, comprising:

an X-ray source (10) comprising an electron gun (111) adapted to generate a continuous beam of electrons onto a target region (121) of an anode (12) for X-ray emission by the anode (12), wherein said anode (12) forms a solid of revolution of a diameter between 100 and 250 millimeters, and is fixedly connected to a motor shaft (16) so that it is driven in rotation by a rotation system (15), and the electron gun (111) and the anode (12) are arranged in a vacuum chamber (13), said chamber (13) comprising an exit window (14) to transmit an X-ray beam emitted by the anode (12) outside of the chamber (13), conditioning means (20) to condition the X-ray beam emitted through the exit window, the conditioning means comprising an X-ray optic (20) adapted to condition the X-ray beam emitted with a two-dimensional optic effect, wherein:

the electron gun (111) is designed to emit an electron beam of a power less than 400 watts, and comprises means (112) to focus said electron beam on the target region (121) in a substantially elongate shape defined by a small dimension (v) and a large dimension (W), wherein the small dimension (v) is comprised between 10 and 30 micrometers and the large dimension (W) is 3 to 20 times greater than the small dimension (v), the rotating anode (12) comprises an emission cooling system (124) to evacuate, by radiation, part of the energy transmitted by the electron beam to the anode, the rotation system (15) comprises a motor with magnetic bearings designed to set the rotating anode (12) in rotation at a speed of more than 20,000 rpm, and the exit window (14) is arranged so as to transmit an X-ray beam emitted by the anode (12) so that the X-ray beam emitted towards the conditioning means (20) is defined by a substantially point-size focal spot of dimension substantially corresponding to the small dimension (v) of the shape of the target region.

2. The device of claim 1, wherein the X-ray optic (20) is a single reflection optic.

3. The device of claim 1 wherein the X-ray optic (20) is curved in two orthogonal directions to produce a two-dimensional optic effect by single reflection.

4. The device of claim 3, wherein the X-ray optic (20) comprises a multilayer coating.

5. The device of claim 1, wherein the exit window (14) is arranged in the chamber (13) so as to transmit an X-ray beam whose mean direction forms an angle ($\alpha$) with the mean plane of the target region of between 3° and 20°, and preferably between 6° and 12°.

6. The device of claim 1, wherein the electron gun (111) is arranged so that the electron beam is substantially parallel to the motor shaft (16).

7. The device of claim 1, wherein the anode (12) is of a substantially cylindrical shape defined by two circular surfaces forming the bases of the anode (12), the two surfaces being joined by a side wall forming the edge of the anode (12), the electron gun (111) being arranged so as to focus the electron beam on one of the two bases of the anode (12).

8. The device of claim 1, wherein the anode comprises an inclined portion at the target region so that the X-ray beam is collected by the conditioning means in a mean direction substantially perpendicular to the axis of rotation of the anode.

9. The device of claim 8, wherein the conditioning means (20) are arranged so that the mean direction of the X-ray beam collected by the optic is substantially radial with respect to the surface of the anode.

10. The device of claim 7, wherein the electron gun (111) comprises means (112) to focus the electron beam so that the large dimension (W) of the target region lies radial to the anode, allowing rotation of the anode to occur in the direction of the small dimension (v).

11. The device of claim 6, wherein the electron gun (111) is arranged on the same side as the rotation system (15).

12. The device of claim 6, wherein the conditioning means (20) are arranged so that the inlet to the X-ray optic (20) is placed at a distance from the focal spot of the X-ray source (10) of between 10 and 30 millimeters.

13. The device of claim 1, further comprising means to shut off the X-ray beam, arranged at the outlet of the X-ray optic (20).

14. The device of claim 1, wherein the rotation system (15) to drive the motor shaft (16) in rotation comprises a rotor of a turbomolecular pump ensuring a secondary vacuum in at least part of the chamber.

15. The device of claim 1, wherein the anode (12) comprises a diamond layer (125) arranged beneath the target (123) defined by the target region (121).

16. The device of claim 15, wherein the anode has a target (123) of thickness less than 5 μm.

17. The device of claim 1, further comprising means to control the position of the focal spot, and a control system comprising means to move the X-ray optic (20), the movement means capable of modifying the positioning of the X-ray optic (20) with respect to the focal spot in relation to variations in the position of the focal spot determined by the control means.

18. The device of claim 1, further comprising an ionization chamber arranged at the outlet of the X-ray optic.

19. An X-ray metrology system for a sample, comprising an X-ray beam delivery device according to claim 6, wherein the X-ray beam delivery system is positioned so that the motor shaft (16) of the anode (12) lies substantially parallel to a mean plane of the sample.

20. An X-ray metrology system for a sample, comprising an X-ray beam delivery device according to claim 6, wherein the device is rotatably mounted about an axis merging with the motor shaft (16) and parallel to a mean plane of the sample.

* * * * *